United States Patent [19]

Kuzma

[11] 4,010,126

[45] Mar. 1, 1977

[54] AQUEOUS EMULSION COPOLYMERS OF VINYL ALKANOATES, ALKYL, ACRYLATES, AND ACRYLIC MODIFIED ALKYDS

[75] Inventor: Edward J. Kuzma, Woodbridge, N.J.

[73] Assignee: Celanese Corporation, New York, N.Y.

[22] Filed: Apr. 11, 1975

[21] Appl. No.: 567,212

[52] U.S. Cl. .................. 260/22 CB; 260/29.6 NR
[51] Int. Cl.$^2$ ......................................... C08L 94/00
[58] Field of Search ............ 260/23 EM, 29.24 A, 260/29.64 A, 33.8 UA, 33.6 UA, 22 CB; 252/8.5 C

[56] References Cited

UNITED STATES PATENTS

| 3,547,847 | 12/1970 | Levine et al. | 260/8 |
| 3,666,345 | 8/1971 | Levine et al. | 260/33.6 R |

Primary Examiner—Donald E. Czaja
Assistant Examiner—William E. Parker
Attorney, Agent, or Firm—John A. Shedden; Kenneth A. Genoni; Thomas J. Morgan

[57] ABSTRACT

Aqueous polymeric emulsions are formed by the interpolymerization reaction product of at least one monomer having a reactive $CH_2=C<$ group (e.g., vinyl acetate and alkyl acrylates) and an alkyd resin which is modified by the incorporation therein of certain ethylenically unsaturated monomers.

4 Claims, No Drawings

AQUEOUS EMULSION COPOLYMERS OF VINYL ALKANOATES, ALKYL, ACRYLATES, AND ACRYLIC MODIFIED ALKYDS

BACKGROUND OF THE INVENTION

This invention relates to polymer emulsion compositions. More particularly, it relates to novel aqueous polymer emulsions of outstanding durability especially when utilized as pigment vehicles over chalked surfaces as compared with previously known polymer emulsions of similar ilk.

Aqueous dispersions or emulsions of synthetic polymers, e.g., homopolymers and copolymers of ethylenically unsaturated monomers such as vinyl esters, lower alkyl acrylates, lower alkyl methacrylates, and the like, have been known for many years. The procedures used to prepare such polymer emulsions generally involve adding, with rapid stirring, one or more polymerizable monomers to water, to which is added, either simultaneously or subsequently, surfactants or emulsifying agents, a polymerization catalyst or initiator and, in many cases, one or more plasticizers and protective colloids or colloid-forming substances. This system is usually heated, either before or during addition of the aforesaid ingredients, to a temperature at which polymerization will be fostered as well as controlled. The reaction system is then maintained at the required temperature and will substantially complete polymerization of the monomer charge as occurred. The resulting polymer emulsion, upon cooling and appropriate work-up, can be used in many domestic and industrial applications, such as in paints or in other coating compositions (e.g., paper coatings and textile treating compositions), in additives or binders, in caulking compositions, and the like, depending on the particular monomers involved and the properties of the emulsion properties derived therefrom.

Vinyl and acrylic polymer emulsions, particularly those derived from vinyl esters of carboxylic acids (e.g. vinyl acetate) and/or alkyl esters of alpha,beta-ethylenically unsaturated carboxylic acids (e.g., lower alkyl acrylates and lower alkyl methacrylates), have come to be used in ever-increasing amounts in recent years in the so-called waterbased or "latex" paints. These latex paints, being substantially odorless, non-flammable and non-irritating to the skin, are useful not only as household paints but also in industrial applications. With the development of new polymers, tailor-made for this use, aqueous polymeric coating compositions or latexes have been made with properties equal to or even superior to those possessed by some solvent-based paints. For example, typical latexes have excellent color-retention an outdoor exposure.

However, one undesirable feature associated with conventional oil-base and alkyd paints is chaulking, which occurs on exterior exposure and is primarily the result of a combination of weathering and ultraviolet degradation of the polymer binder. The chaulked surface has a definite water demand. This results in a strong wicking force which rapidly extracts the water from new latex paint, causing the film to form on the surface rather than penetrate to the substrate. Although a polymer latex is a dispersion of resin particles of micron size, the extremely small interstices of the chaulked surface resist penetration and act as a filter which lets water through but holds the solid resin particles back, thus preventing sound adhesion. As a result, while common latex paints do not chaulk on outdoor exposure, their adhesion to chaulky surfaces is very poor, and thus extensive surface preparation is necessary before they can be applied over chaulked paint films.

One expedient which has been used to permit the use of latex paints over chaulked paint films without prior surface preparation involves emulsifying the latex paint with rather substantial amounts, i.e., usually up to about 25% and sometimes as much as 50% by weight, based on the emulsion solids, of various additives such as solvents, oils, alkyds, and other proprietary specialties. Alkyds are polyesters of a polyhydric alcohol (e.g., glycerol or pentaerythritol) and a polybasic acid or anhydride (e.g., phthalic anhydride) modified with a fatty acid or oil. Upon application, the above-mentioned additives, which are merely physically present in the latex and form an essentially incompatible mixture with it, go out of the emulsion, penetrate the chaulky surface, and possibly bond with some oil or oil-like molecules from the original oil-base of the alkyd paint which are found at the surface of the old paint film and beneath chaulky layer. This can result in the formation of a matrix for the chaulky residue, which would then permit the latex portion of the emulsion to adhere to the painted surface.

Whatever the mechanism of action of these drying oil/alkyd/etc.-latex paint emulsions, their use gives rise to as many problems as it solves. Thus, for example, such emulsions themselves can chaulk, due to the presence of the various additives. They also have poor color retention. Additionally, such paint films harden to become brittle and yellow with age. Certain oils such as soya oil, in addition, suffer from very slow dry time and, when added, seriously impair the freeze-thaw stability of the latex. The alkyds as a class tend to be of higher molecular weight and, therefore, exhibit much higher viscosities than the oils. As a result, their penetration ability is reduced considerably. They also tend to reduce scrubability and impair freeze-thaw stability. In essence, then, the use of these additives physically emulsified with latex emulsions detracts from the very properties that are expected of the final latex product.

Significant gains have been made in recent years in eliminating the severity of many of the property problems above illustrated when the aforementioned additives were physically emulsified with the latex paints by chemically combining with the vinyl alkanoate and alkyl acrylate monomers a drying oil, for example, safflower oil, castor oil, oiticica oil, sunflower oil, soybean oil, perrilla oil, tall oil, dehydrated castor oil, poppy oil, tung oil, very long oil alkyds, long oil alkyds and the like. When this chemical union is accomplished, as taught in U.S. Pat. No. 3,547,847, as opposed to the physical emulsion techniques utilized in earlier art improvements are realized in certain properties of the latex paints that use these polymers as vehicles. Although the adhesion characteristics of these formulated paints over chaulky substrates are improved over the compositions wherein the dry oils and/or additives are physically emulsified, they still suffer from the severe disadvantage of realizing premature failure to adhere to chaulky paint surfaces due to their inability to adequately penetrate said surfaces.

Accordingly, it is an object of the present invention to provide a synthetic polymer which, when formulated as an aqueous emulsion, possesses superior adhesion characteristics over chaulky substrates.

Furthermore, another object is to provide superior latex paint vehicles using chemically combined acrylic modified alkyds.

DESCRIPTION OF THE INVENTION

The foregoing objects are achieved according to the present invention by the discovery of an aqueous polymer emulsion comprising the interpolymerixation reaction product of:

a. from about 60 to about 90% by weight based on the total monomer/resin weight of at least one monomer having the polymerization-reactive $CH_2=C<$ grouping selected from the group consisting of
  1. vinyl esters of carboxylic acids wherein the acrylate radical contains from 1 to 4 carbon atoms; and
  2. alkyl acrylate and methacrylate monomers wherein the alkyl radical contains from 1 to 10 carbon atoms; and b. from about 10 to about 40% by weight based on the total monomer/resin weight of an acrylic modified alkyd resin produced by the condensation reaction of at least one of each of the following:
  1. an esterifiable polyhydric alcohol,
  2. a saturated, mono-unsaturated, or poly-unsaturated fatty acid or fatty acid oil;
  3. a polycarboxylic acid or anhydride thereof; and
  4. a monomer selected from the class of compounds having the formula:

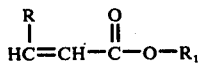

wherein R is —H or —$CH_3$ and $R_1$ is —H or a branched or unbranched lower alkyl group of from 1 to 10 carbon atoms.

The alkyl acrylate and methacrylate monomers which can be used in the composition are those wherein the alkyl radical can contain from 1 to 10 carbon atoms, preferably 1 to 8 carbon atoms. These monomers include, among others: methyl acrylate, ethyl acrylate, propyl acrylate, n-butyl acrylate, iso-butyl acrylate, 2-ethyl hexyl acrylate, methyl methacrylate, ethyl methacrylate, iso-butyl methacrylate, 2-ethyl hexyl methacrylate or the like or combinations thereof.

The vinyl alkanoates which can be used herein include those having from 1 to 4 carbon atoms, preferably vinyl acetate, in the alkylate radical. Typical of the vinyl alkanoates include, among others, vinyl acetate, vinyl propionarte, vinyl butyrate, vinyl isobutyrate, vinyl valerate, vinyl caproate and the like.

Additional unsaturated compounds can be combined with the above monomers to provide desirable compositions. These compounds include aliphatic vinyl ethers, dialkyl esters of mono-ethylenically unsaturated dicarboxylic acids, polymerizable ethylenically unsaturated monocarboxylic and polycarboxylic acids, the available anhydrides, nitriles, unsubstituted amides, substituted amides of said acids, substituted and unsubstituted aminoalkyl acrylates and methacrylates, styrene among others.

The amounts of the vinyl alkanoates can range from about 50 to about 90%, preferably from about 65 to 85%, by weight of the total monomer/resin, the amounts of alkyl acrylates can range from about 0 to about 30%, preferably from about 15 to about 25 weight percent on the total monomer/resin.

The acrylic modified alkyd resins have been made in the past by several methods.

One procedure involves contacting and reacting, under free radical polymerization conditions, one or more acrylic monomeric compounds with either a preformed alkyd resin or, alternatively, with the alkyd resin precursors during the formation of the resin. This method suffers from the disadvantage that the final product is a mixture of homopolymer or copolymer (derived from the acrylic monomer or monomers) unmodified alkyd resin. While the final product may have an acceptably low viscosity, the components of this mixture are often only marginally compatible, resulting thereby in paints and other coatings having poor shelf-stability and uniformity.

A second procedure involves the formation of an acrylic polymer containing pendant carboxy substituents, followed by reaction of this "prepolymer" with the partial ester of a fatty acid and a polyhydric alcohol (i.e., an ester in which not all the hydroxy substituents are esterified), either before, during, or after the condensation of said partial ester with the polycarboxylic acid component of the alkyd resin. This method has the advantage of providing resins of improved uniformity compared to the resins prepared in the first procedure described above. However, the modification of an alkyd resin by grafting thereon a prepolymer having sufficient carboxylic acid functionality to insure a uniform, haze-free resin, often results in a final product which is too viscous to permit convenient handling, thus diminishing the utility of the process.

The preferred method of forming the acrylic modified alkyd resins of the present invention is to form an acrylic polymer containing not only carboxy substituents (i.e., —COOH substituents) but also hydroxy substituents (i.e., —C—OH substituents) as well, and reacting this polymer (hereinafter called the "prepolyner") with a mixture of alkyd resin components or precursors, i.e., a polycarboxylic acid (or, alternatively, the corresponding anhydride), a polyhydric alcohol, and a fatty acid (or, alternatively, the corresponding triglyceride or fatty acid oil).

This third and in fact the preferred method of forming the acrylic modified alkyd resin is taught in U.S. Pat. No. 3,600,345. Acrylic carboxy-substituted monomers suitable for use in forming the acrylic prepolymer include acrylic acid and lower alkyl and aryl derivatives of acrylic acid, for example, methacrylic acid and alpha-phenyl acrylic acid.

Typical hydroxy-substituted acrylic monmers suitable for use in forming the prepolymer include hydroxy-substituted lower alkyl esters of alpha,beta-unsaturated carboxylic acids, for example, 2-hydroxy ethyl acrylate, 2-hydroxy propyl acrylate, 4-hydroxy butyl acrylate, and the corresponding methacrylate derivatives.

The aforementioned hydroxy and carboxy substituted acrylic monomers can be used either individually or as mixtures of a plurality of such monomers, and it is also contemplated that the preparation of such monomers can alternatively be prepared in situ. The balance of the monomer charge used in preparing the prepolymer, i.e., the non-carboxy-non-hydroxy substituted acrylic monomer portion of the monomer charge can be made up of one or more of those acrylic monomers conventionally used in the art to make acrylic polymers. Typical examples of noncarboxy-non-hydroxy-substituted monomers include lower alkyl esters of alpha, beta-unsaturated carboxylic acids, for example, methalacrylate, ethlacrylate, butylacrylate, methyl methacrylate, butyl methacrylate and others previously disclosed as typical latex monomers.

The prepolymer employed in the present invention is produced in a conventional manner, e.g. by means of aqueous emulsion polymerization techniques or by solution in a suitable solvent. In either case the polymerization occurs with the aid of a suitable, conventional free radical producing catalyst or initiator.

When forming the prepolymer under solution polymerization conditions, the solvent employed can be any solvent conventional in the solution polymerization art, e.g. aliphatic and aromatic hydrocarbons such as xylene, toluene, and the like. Any free-radical catalyst or combination of catalysts conventionally known to be useful in solution polymerization can be utilized, e.g. organic peroxide catalysts such as benzoyl peroxide, dicumyl peroxide, azodiisobutyronitrile, and the like. As a general rule, the amount of catalyst or catalysts employed is such as to provide a prepolymer having an average molecular weight between about 4500 and about 25,000 and preferably between about 6,000 and about 12,000. Accordingly, the amount of catalyst is desirably taken between about 0.1% (to produce relatively high molecular weight prepolymers) and about 10% (to produce relatively low molecular weight prepolymer) by weight, based on the total weight of the monomer charge.

The polymerization of the monomer charge is generally conducted at atmospheric pressure, although higher pressures, e.g., autogenous, are advantageously employed when the monomer charge contains a normally gaseous component, e.g. ethylene.

The temperature employed in the polymerization of the monomer charge are those for example between about 50° C and about 200° C which are effective in initiating and completing the polymerization within a reasonably short period of time, for example on the order of a few hours.

The alkyd resins which are modified by grafting thereon the above-described acrylic prepolymers according to the present invention include any such alkyd resin conventional in the art. Suitable alkyd resins are derived from three general components: (1) a polyhydric alcohol (or mixture thereof); (2) a polycarboxylic acid or anhydride (or mixture thereof); and (3) a fatty acid (or mixture thereof).

Polyhydric alcohols suitable for preparing the alkyd resin include any alcohol containing at least 2 and preferably at least 3 esterifiable hydroxy substituents. Examples of such polyhydric alcohols are: ethylene glycol, glycerol, pentaerythritol, dipentaerythritol, trimethylolethane, trimethylolpropane, sorbitol, and the like. When a dihydric alcohol is used, it is generally employed conjointly with one or more alcohols containing at least 3 esterifiable hydroxy substituents.

Polycarboxylic acids or anhydrides thereof suitable for preparing the alkyd resin include any carboxylic acid containing at least 2 esterifiable carboxy substituents. Examples of such polycarboxylic acids are: maleic acid (or maleic anhydride), fumaric acid, succinic acid (or succinic anhydride), adipic acid, cyclohexane-1,4-dicarboxylic acid, isophthalic acid, phthalic acid (or phthalic anhydride), trimesic acid, and the like. In addition, a monocarboxylic acid (for example, benzoic acid) can be included as an ancillary component which serves inter alia to limit the molecular weight of the alkyd resin and prevent thereby the development of excessive viscosities.

Fatty acids suitable for preparing the alkyd resin include any long-chain, polyethylenically unsaturated carboxylic acid which is a member of the class known as the "drying oil acids". Examples of such acids are: linoleic acid, linolenic acid, licanic acid, eleostearic acid, and the like. Alternatively, the drying oils themselves, for example, tung oil, linseed oil, safflower oil, soybean oil, and the like, can be utilized by direct alcoholysis with the aforementioned polyhydric alcohols, usually in the presence of a conventional, transesterification catalyst, for example, litharge, sodium hydroxide, and the like. Optionally, the alkyd resin can be prepared from fatty acids which are long-chain, saturated carboxylic acids and which are members of the class known as "non-drying oil acids". Examples of such acids are: lauric acid, myristic acid, palmitic acid, and stearic acid. Alternatively, the non-drying oils themselves, for example, peanut oil, rape oil, ovile olive oil, castor oil, and the like, can be utilized, preferably in conjunction with a suitable conventional, transesterification catalyst. Also useful as the fatty acid component of the alkyd resin are any one or more of the long-chained, mono-ethylenically unsaturated carboxylic acids known as "semi-drying oil acids". Examples of such acids are: oleic acid, ricinoleic acid, vaccenic acid, and eruic acid. Alternatively, the semi-drying oil themselves, for example, corn oil, sesame oil, cotton seed oil, and the like, can be utilized preferably in conjunction with the suitable conventional transesterification catalyst. Generally, if a drying oil or a drying oil acid is used in preparing the acrylic modified alkyd resin, said resin will be curable by exposure to air.

The alkyd resin formation step of the present invention can be carried out in any conventional manner, except that such step is conducted in the reactive presence of the above-described prepolymer (to give an acrylic prepolymer-modified alkyd resin). Thus, the precursors of the alkyd resin can be admixed with the prepolymer and the resulting mixture subjected to esterification conditions. For example, the aforementiond mixture can be heated at a temperature generally in the range of from about 200° C to about 275° C with the inherent acidity of the system providing the necessary catalysts. Alternatively, the above heating can be conducted in the chemical presence of a separate acid catalyst, e.g. paratoluene sulfonic acid. This latter variant is especially preferred when the polycarboxylic acid is used in the form of an anhydride and the fatty acid is used in the form of the corresponding triglyceride or fatty acid oil.

The acrylic modified alkyd resin can also be prepared by a two step procedure which comprises (1) heating a mixture of prepolymer, polyhydric alcohol, and fatty acid (or fatty acid oil) under esterification conditions of the type described hereinabove, and (2) adding the polycarboxylic acid (or corresponding anhydride) to the composition formed in step (1) and further heating the resulting mixture under suitable esterification conditions, e.g. at a temperature of between about 200° C and about 275° C to form the prepolymer-modified alkyd resin.

This temperature is usually maintained until the acid number of the reaction mixture has decreased to a value indicating substantially complete esterification of the carboxylic acid substituents originally present on the prepolymer as well as the carboxylic acid substituents derived from the alkyd resin components. Generally, the final acid number should be as low as possible, with an acid number of less than about 15 being preferred.

The final aqueous emulsion interpolymer of the instant invention is prepared by any of the conventional techniques utilized by the latex industry. Typically, the polymerization temperature required to produce the aqueous emulsions of this invention will generally range from about room temperature or lower to about 100° C or above, and preferably from about 60° to 90° C and can be varied as the final polymerization proceeds toward substantial completion. Subatmospheric, atmospheric or superatmospheric pressures can be employed during all or part of the polymerization, and depending on the monomers and catalyst employed in the reaction, can be carried out, if desired, under inert atmosphere, for example, under an inert nitrogen or carbon dioxide atmosphere. Thus, for example, polymerizations carried out at temperatures 10° C or more below the boiling point of the lowest boiling monomer present will generally take place under an inert atmosphere.

Additionally, viscosity of the acrylic modified alkyd resin can be controlled prior to being introduced into the final emulsification reaction via dilution with one or more of the final alkanoate monomers.

The surfactants which can be used in the process of this invention can include, any anionic or non-ionic surfactant (which can also be termed as emulsifying agent, a dispersing agent or a wetting agent), or mixtures thereof, which can be employed in preparing conventional acrylic polymer emulsions, can be used.

Among the non-ionic surfactants which can be used are polyethers, e.g., ethylene oxide and propylene oxide condensates in general, which include straight and branched-chain alkyl and alkylaryl polyethylene glycol and polypropylene glycol ethers and thioethers, and more particularly substances such as the "Igepals," which are members of a homologous series of alkylphenoxypoly(ethyleneoxy)ethanols, included among which are alkylphenoxypoly(ethyleneoxy)ethanols having alkyl groups containing from about 7 to about 18 carbon atoms, inclusive and having from about 10 to about 150 ethyleneoxy units, such as the heptylphenoxypoly(ethyleneoxy)ethanols, nonylphenoxypoly(ethyleneoxy)ethanols and dodecylphenoxypoly(ethyleneoxy) ethanols; the polyoxyalkylene derivatives of hexitol (including sorbitans, sorbides, mannitans and mannides) anhydride partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, said base being formed by condensing propylene oxide with propylene glycol; sulfurcontaining condensates, e.g., those prepared by condensing ethylene oxide with higher alkyl mercaptans, such as nonyl dodecyl or tetradecyl mercaptan, or with alkylthiophenols wherein the alkyl group contains from 6 to 15 carbon atoms; ethylene oxide derivatives of long-chain carboxylic acids such as lauric, myristic, palmitic or oleic acid or mixtures of acids, such as tall oil, and ethylene oxide derivatives of long-chain alcohols such as octyl, decyl, lauryl, or cetyl alcohol.

Among the anionic surfactants which can be used are the higher molecular weight sulfates and sulfonates, e.g., sodium and potassium alkyl, aryl and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene solfonate and sodium xylene sulfonate, higher fatty alcohols, e.g., stearyl, lauryl, etc..which have been ethoxylated and sulfonated, dialkyl esters of alkali metal sulfosuccinic acid salts, such as sodium diamyl sulfosuccinate, sodium dihexyl sulfosuccinate and sodium dioctyl sulfosuccinate, and formaldehyde naphthalene sulfonic acid condensation products.

The amount of surfactant employed in the emulsion polymerization process, will range in an amount from about 1% to about 10% by weight, based on the total weight of the monomer/resin emulsion, and this can be the case whether a non-ionic surfactant is employed. However, it is preferred when using typical non-ionic surfactants, e.g., those of the above-described alkylphenoxypoly(ethyleneoxy)ethanols with contain from about 30 to about 100 ethyleneoxy units, or typical anionic surfactants, e.g., an ethoxylated higher fatty alcohol which has also been sulfonated to employ them to amounts ranging from about 1.5% to about 6% by weight, on the above-stated basis.

Aside from the surfactant mixture employed the monomer reactants can also contain small amounts of one or more protective colloids, particularly when a reflux-type polymerization is carried out using vinyl acetate or the like as part of the monomer charge. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., ones containing no ether linkages, can also be used either alone or together with the aforementioned ether linkage-containing materials, and included among these are partially and fully hydrolyzed polyvinyl alcohols, polyacrylic acid, sodium and other alkali metal polyacrylates, polyacrylamide, poly (methyl vinyl ether/maleic anhydride), polyvinylpyrrolidone, water soluble starch, glue, gelatin, water soluble alginates such as sodium or potassium alginate, casein, agar, and natural and synthetic gums, such as gum arabic and gum tragacanth. All of these materials will be used in the amounts found in conventional emulsion polymerization procedures, i.e., in amounts usually ranging from about 0.1% to about 2% by weight, based on the total weight of the polymer emulsion.

The monomer or monomers will be polymerized by means of a catalytic amount of a conventional free radical polymerzation catalyst or catalyst system (which can also be referred to as an addition polymerization catalyst, a vinyl polymerization catalyst or a polymerization initiator), preferably, although not necessarily one which is substantially water soluble. Among such catalyst are inorganic peroxides such as hydrogen peroxide, alkali metal (e.g., sodium, potassium or lithium) and ammonium persulfates, perphosphates and perborates, azonitriles, such as azobisisobutyronitrile and redox systems, including such combinations as mixtures of hydrogen peroxide, t-butyl hydroperoxide, or the like and any of an iron salt, a titanous salt, zinc formaldehyde sulfoxylate or sodium formaldehyde sulfoxylate; an alkali metal or ammonium persulfate, borate or ethoxylated together with an alkali metal bisulfite such as sodium metabisulfite; an alkali metal persulfate together with an arylphosphinic acid such as benzenephosphinic acid, and the like.

In accordance with the customary practice of the art, the amount of polymerization catalyst employed will be no more than that required to obtain substantially complete monomer conversion at lowest catalyst cost. Thus, for example, from about 0.3% to about 0.5% by weight of a perchlorate such as ammonium perchlorate together with approximately equal amount of a bisulfite such as sodium metabisulfite, and preferably about 0.4% by weight of the perchlorate together with about 0.4% by weight of the bisulfite, each of these weight percentages being based on the total weight of the monomer/resin emulsion, can be employed.

It is also possible, when using redox catalyst systems, to dissolve the oxidant, e.g., ammonium persulfate, in the surfactant-water mixture prior to the preparation of the monomer pre-emulsion, and to then add the reductant, together with the oxidant-containing monomer pre-emulsion, to the water in which is will be polymerized.

The amount of water to which the monomer/resins are added will be determined by the solids content desired in the finished polymer emulsion. These solids content can range from as low as 20% to as high as 70% or higher.

In order that those skilled in the art can more fully understand the present invention, the following Examples are set forth. These examples are given solely for the purpose of illustrating the invention, and should not be considered as expressing limitations unless so set forth in the appended claims. All parts and percentages are by weight, unless otherwise stated.

EXAMPLE I

This example illustrates the acrylic modified alkyd resin emulsion of the instant invention.

a. Acrylic Modified Alkyd Resin Preparation 281.3 grams of xylol and 2.62 grams of dicumyl peroxide are added to a three necked flask equipped with a stirrer. The mixture is heated to reflux at approximately 138° C. A second bath is admixed in a and contains the following:

|  | Wt. % | Wt. in Grams |
|---|---|---|
| Methyl Methacrylate | 46.85 | 87.84 |
| Ethyl Acrylate | 46.85 | 87.84 |
| Hydroxy Methyl Methacrylate | 4.05 | 7.59 |
| Acrylic Acid | 2.25 | 4.22 |
| Dicumyl Peroxide |  | 3.28 |

This mixture is put in a dropping funnel and added to the first stage at reflux over a 2 hour period.

An additional batch of 31.20 grams of xylol and 0.656 of dicumyl peroxide is put in a dropping funnel and added to the above mixtures over a period of one half an hour. The total batch is held for 1 hour at reflux, i.e., about 141° C. The batch is then cooled to a temperature at from about room temperature to 100° C.

The following is then added one at a time directly into the above cooled batch:

|  | Wt. % | Wt. in Grams |
|---|---|---|
| Soya Fatty Acids | 58.66 | 329.96 |
| Phthalic Anhydride | 20.00 | 112.50 |
| Pentaerythritol | 21.34 | 120.04 |

This mixture is then heated to approximately 154° C and the xylol is stripped off overhead. The reaction is continued until an acid number of about 15 or below is reached. The batch is then cooled to approximately 100° C of lower. This acrylic modified alkyd resin is then cut with vinyl acetate to a solids content of approximately 50%.

b. Preparation of the Interpolymerization Emulsion with the Acrylic Modified Alkyd Resin The following materials are used in the preparation of the emulsion:

| Formulation | Parts by Weight |
|---|---|
| Vinyl Acetate | 314.8 |
| Butylacrylate | 70.2 |
| Acrylic Modified Alkyd Resin | 165.0 |
| Tertiary Butyl Hydro Peroxide | 1.8 |
| Igepal CA-897* | 27.6 |
| Triton X-200** | 3.1 |
| Sodium Persulfate | 0.1 |
| Hydrozin*** | 1.36 |
| Natrosol 180LR**** | 2.00 |
| Water, initial | 197.6 |

*Igepal is a trademark of the GAF Corporation for an alkyl phenoxy poly (oxyethylene) ethanol resulting from the combination of an alkyl phenol with ethylene oxide.
**Triton is a trademark of the Rohm & Haas Company for surfactants based on alkyl aryl polyether alcohols, sulfonates and sulfates; non-ionic, cationic and anionic types; oil soluble and water-soluble types.
***Hydrozin is a trademark of the Nopco Chemical Company for normal zinc formaldehyde sulfoxylate.
****Netrosol is a trademark of Hercules Inc. for hydroxy ethyl cellulose.

The vinyl acetate; butylacrylate; acrylic modified alkyd resin, tert-butyl hydroperoxide; Igepal and Triton are preemulsified in 150cc of water, and transferred to a calibrated dropping funnel for later drip feed addition to the reactor. A solution of 0.1 grams of the sodium persulfate is made in 10cc's of water and also transferred to a calibrated dropping funnel for later drip feed to the reactor. The reactor is charged with the Hydrozin, Natrosol and 197.6 grams of water. This reaction mixture is agitated and heated to approximately 65° C at which time the emulsified monomer feed mixture and catalyst solutions is drip fed to the reactor vessel. The monomer blend is added evenly over four hours and the catalyst solution over four hours, ten minutes. The reaction temperature is maintained between 72° and 75°C. When the additions are completed the reaction mass temperature is held at about 70° C for about 30 minutes. The interpolymerized reaction product is then cooled to room temperature and strained upon discharge.

c. Formulation of the Latex Paints
1. Semi-gloss

The following is added in the order tested and dispersed with a Cowles blade until smooth:

|  | Pounds | Gallons |
|---|---|---|
| Water | 92.40 | 11.10 |
| Natrosol | 1.19 | 0.10 |
| Troykid 666* | 1.43 | 0.20 |

-continued

| | Pounds | Gallons |
|---|---|---|
| Triton CF-10 | 2.67 | 0.30 |
| Tamol GR-7** | 2.86 | 0.35 |
| Super Adit*** | 0.24 | 0.07 |
| Glycocel DE**** | 13.81 | 1.70 |
| The following is then added and mixed to a 6 grind: | | |
| Ironox CR-800 (5*) | 223.85 | 6.40 |
| White Barytes No. 2250 (6*) | 69.06 | 1.96 |

The mixing is continued until uniform and then the batch is let down in the following order:

| | | |
|---|---|---|
| Propylene Glycol | 67.63 | 7.95 |
| Pine Oil | 0.95 | 0.12 |
| Colloid 60 (7*) | 3.81 | 0.50 |
| Ethylene Glycol | 26.67 | 2.95 |
| The Latex, cut to 46% total solids | 535.35 | 60.25 |
| Water (viscosity/adjustment) | 42.87 | 5.15 |

2. Flat

The following is added in the order listed and dispersed with a Cowles Dissolver:

| | Pounds | Gallons |
|---|---|---|
| Water | 110.0 | 13.20 |
| Natrosol 250 4 HR | 1.3 | 0.13 |
| Propylene Glycol | 15.0 | 1.70 |
| Potassium Tri Poly Phosphate | 1.0 | — |
| Tamol 731 | 4.0 | 0.40 |
| Igepal CA-630 | 2.5 | 0.30 |
| Potassium Carbonate | 1.0 | — |
| R-960 (8*) | 225.0 | 6.70 |
| Minex 4 (9*) | 100.0 | 4.50 |
| Texanol (10*) | 7.0 | 0.90 |
| Colloid 677 | 1.5 | 0.20 |

The above mixture is let down with

| | | |
|---|---|---|
| Latex (46% total solids) | 368.0 | 41.0 |
| Colloid 667 | 1.0 | 0.10 |
| Water | 257.0 | 30.87 |
| NH₄OH | 1.0 | — |

* Troykid 666 is a trademark of Troy Chemical Co. for an anti-foaming agent.
 ** Tamol GR-7 is a trademark of Rohm & Haas for an anionic dispersant.
 *** Super adit is a trademark of Nuodex, Inc. for a fungicide.
 **** Glycocel DE is a trademark of Celanese Corporation for diethylene glycol mono ethyl ether.

(5*) Ironox CR-800 is a trademark of Kerr McGee Co. for rutile $TiO_2$.
(6*) White Barytes #2250 is a trademark of Thompson Neiman Co. for barium sulphate.
(7*) Colloid is a trademark of Colloid Inc. for anti-foaming agents.
(8*) R-960 is a trademark of DuPont Co. for $TiO_2$.
(9*) Minex 4 is a trademark of Indusmin Ltd. for aluminum silicate and calcium carbonate mixtures.
(10*) Texanol is a trademark of Eastman Chemical for a solvent coalescent aid.

EXAMPLE II

This example illustrates the preparation of another acrylic modified alkyd resin emulsion of the instant invention..

a. Acrylic Modified Alkyd Resin Preparation 281.3 grams of xylol and 2.62 grams of dicumyl peroxide are added to a three-necked flask equipped with a stirrer. The mixture is heated to reflux at approximately 138° C. A second bath is admixed in a beaker and contains the following:

| | Wt. % | Wt. in Grams |
|---|---|---|
| Methyl Methacrylate | 33.62 | 63.04 |
| 2-ethyl hexyl acrylate | 61.86 | 115.99 |
| Hydroxy ethyl methacrylate | 2.91 | 5.46 |
| Acrylic Acid | 1.61 | 3.01 |
| Di cumyl peroxide | | 3.28 |

This mixture is put in a dropping funnel; added to the first stage at reflux over a two hour period and the acrylic modified alkyd resin prepared as in Example I.

An interpolymerization emulsion and final latex paints (semi-gloss and flat) are prepared as in Example I utilizing the acrylic modified alkyd resin prepared above.

EXAMPLE III a. Preparation of an Interpolymerization Emulsion with an Unmodified Long Oil Alkyd Resin The following materials are used in the preparation of the emulsion:

| Formulation | Parts by Weight |
|---|---|
| Vinyl Acetate | 314.8 |
| Butyl Acrylate | 70.2 |
| Cargill 7700 (50% total solids)* | 165.0 |
| Tertiary butyl hydro peroxide | 1.8 |
| Igepal CA-897 | 27.6 |
| Triton X-200 | 3.1 |
| Sodium Persulfate | 0.1 |
| Hydrozin | 1.36 |
| Natrosol 180 LR | 2.00 |
| Water, initial | 197.6 |

*Cargill 7700 is a trademark of Cargill Inc. for an isophthalic safflower-oil type alkyd resin. As used above, it is first let down in vinyl acetate with high speed agitation.

The interpolymerization emulsion and latex paints (semi-gloss and flat) are prepared as in Examples I and II.

EXAMPLE IV

The following is the preparation of a vinyl acetate/butyl acrylate copolymer paint latex with unmodified alkyd resin physically admixed.

| Formulation | Parts by Weight |
|---|---|
| Vinyl Acetate | 459.00 |
| Butyl acrylate | 81.00 |
| Natrosol 180 GR | 5.50 |
| Igepal CO-977 | 17.00 |
| Igepal CO-630 | 8.00 |
| Sodium Bicarbonate | 1.00 |
| Sodium Persulfate | 0.75 |
| Water | 427.75 |

The vinyl acetate and butyl acrylate monomers are blended and transferred to a calibrated dropping funnel for later drip feed to the reactor. A 0.50 gram sodium persulfate solution in 50 grams of water is prepared and transferred to a second calibrated dropping funnel for later drip feed to the reactor.

The reactor is then charged with the following:

| | Wt. (Grams) |
|---|---|
| Water | 377.75 |
| Igipal CO-977 | 17.00 |
| Igipal CO-630 | 8.00 |
| Natrosol 180 GR | 5.50 |
| Sodium Bicarbonate | 1.00 |

The reactor is agitated and heated to about 72° C at which time 0.25 grams of the sodium persulfate is added. Drip feed is begun of both the monomers and catalyst solutions. The monomer is blended evenly over a four hour period and the catalyst for four hours and ten minutes. The reaction temperature is maintained at from about 72° – 75° C until the feed addition is completed at which time the temperature is raised to 90° C. This temperature is maintained for 20 – 30 minutes at which time the reactor mass is cooled and strained upon discharge.

The latex paints (semi-gloss and flat) and prepared as in Examples I through III.

EXAMPLE V

The vinyl acetate/butyl acrylate copolymer emulsion is prepared as in Example IV.

95.29 grams of Cargill 7700 (100% total solids) are added at about room temperature and blended for 30 minutes.

Latex paints (semi-gloss and flat) are prepared as in Examples I through IV.

Test No. 1: Six inch by twelve inch Southern pin panels are prepared with chaulky substrate surfaces and coated with each of the semi-gloss paints prepared in Examples I through V. These panels are exposed to the weather in San Juan, Puerto Rico for 1 year. The blistering is noted on a scale of 0 to 10: 0 denoting no blistering observed and 10 representing complete failure (e.g. peeling) of the latex surface.

Test No. 2: Twelve inch by twelve inch Southern Pine panels are prepared by dividing them into three subdivisions. The first is bare wood; the second is primed with an alkyd resin paint and the third is coated with a glossy enamel (alkyd based) paint.

These panels are then coated with each of the semi-gloss paints prepared in Examples I through V. These panels are exposed to the weather in San Juan, Puerto Rico for one year. The cracking is noted on a scale of 0 to 10: 0 denoting no cracking observed and 10 representing complete striation and subsequent flaking of the latex surface.

As can be seen from the above, the interpolymerization reaction emulsions of the instant invention when formulated into latex paints give paint films with outstanding surface-finish characteristics. Furthermore, the results show that these films, when compared to the prior art films utilizing latex vehicles with and without unmodified alkyd resins (chemically and physically) blended, yield coatings over bare, primed, enameled and chaulked wood surfaces with superior adhesion properties.

I claim:

1. An aqueous emulsion vehicle comprising the interpolymerization reaction product of
   a. from about 60 to about 90% by weight based on the total monomer/resin weight of at least one monomer having the polymerization-reactive $CH_2=C<$ grouping selected from the group consisting of
      1. Vinyl acetate and
      2. alkyl acetate and methacrylate monomers wherein the alkyl radical contains from 1 to 10 carbon atoms; and
   b. from about 10 to about 40% by weight based on the total monomer/resin weight of an acrylic modified alkyd resin produced by the condensation reaction of at least one of each of the following:
      1. an esterifiable polyhydric alcohol,
      2. saturated, mono-unsaturated, or poly-unsaturated fatty acid or fatty acid oil;
      3. A polycarboxylic acid or anhydride thereof; and
      4. a monomer selected from the class of compounds having the formula:

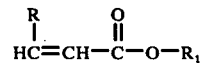

wherein R is —H or —$CH_3$ and $R_1$ is —H or a branched or unbranched lower alkyl group of from 1 to 10 carbon atoms.

2. An aqueous emulsion vehicle comprising the interpolymerization reaction product of
   a. from about 70 to about 85% by weight based on the total monomer/resin weight of at least one monomer having the polymerization-reactive $CH_2=C<$ grouping selected from the group consisting of
      1. vinyl acetate and

TABLE I

| Paints of Example: | Description | Test No. 1 (gloss) blistering | Test No. 2 (gloss) cracking | Test No. 3 (flat) Adhesion |
|---|---|---|---|---|
| I | Acrylic Acid Interpolymerization Vehicle | 4 | 2<br>2<br>0 | 2<br>2<br>0 |
| II | Acrylic acid Interpolymerization Vehicle | 4 | 4<br>2<br>0 | 2<br>6<br>0 |
| III | Unmodified Alkyd Interpolymerization Vehicle | 7 | 2<br>4<br>2 | 4<br>4<br>0 |
| IV | Latex (No Alkyd) | 10 | 2<br>4<br>0 | 4<br>4<br>2 |
| V | Latex with Unmodified Alkyd Physically Admixed | 8 | 4<br>2<br>2 | 4<br>4<br>2 |

2. alkyl acrylate and methacrylate monomers wherein the alkyl radical contains from 1 to 6 carbon atoms; and b. from about 15 to about 30% by weight based on the total monomer/resin weight of an acrylic modified alkyd resin produced by the condensation reaction of at least one of each of the following:
1. an esterifiable polyhydric alcohol,
2. a saturated, mono-unsaturated, or poly-unsaturated fatty acid or fatty acid oil;
3. a polycarboxylic acid or anhydride thereof; and
4. a monomer selected from the class of compounds having the formula:

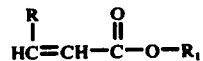

wherein R is —H or —CH$_3$ and R$_1$ is —H or a branched or unbranched lower alkyl group of from 1 to 10 carbon atoms.

3. the vehicle of claim 1 wherein the alkyl acryate is n-butyl acrylate.

4. The vehicle of claim 3 wherein the fatty acid is Soya; the polyhydric alcohol is pentaerythritol; and the polycarboxylic acid anhydride is phthalic anhydride.

* * * * *